United States Patent [19]

Winberg et al.

[11] Patent Number: 5,339,629
[45] Date of Patent: Aug. 23, 1994

[54] EXTERNAL CATALYTIC CONVERTER FOR SMALL INTERNAL COMBUSTION ENGINES

[75] Inventors: James R. Winberg, Brookfield; Keith O. Daby, Sussex, both of Wis.

[73] Assignee: Briggs & Stratton Corporation, Wauwatosa, Wis.

[21] Appl. No.: 26,858

[22] Filed: Mar. 5, 1993

[51] Int. Cl.$^5$ ............................................. F01N 3/10
[52] U.S. Cl. .................................... 60/299; 60/302
[58] Field of Search ................................ 60/299, 302

[56] References Cited

U.S. PATENT DOCUMENTS

| | | | |
|---|---|---|---|
| 1,793,813 | 2/1931 | Mackinnon | 422/171 |
| 3,106,821 | 10/1963 | Ridgway | 60/293 |
| 3,116,596 | 1/1964 | Boehme et al. | 60/307 |
| 3,124,930 | 3/1964 | Powers | 60/302 |
| 3,247,665 | 4/1966 | Behrens | 60/292 |
| 3,247,666 | 4/1966 | Behrens | 60/292 |
| 3,314,230 | 4/1967 | Vanderpoel | 60/293 |
| 3,498,054 | 3/1970 | Theed | 60/299 |
| 3,563,030 | 3/1971 | Lentz et al. | 60/299 |
| 3,595,015 | 7/1971 | Kretschmer | 60/303 |
| 3,653,212 | 4/1972 | Gast et al. | 60/293 |
| 3,656,915 | 4/1972 | Tourtellotte | 422/171 |
| 3,775,064 | 11/1973 | Berger et al. | 60/290 |
| 3,963,444 | 6/1976 | Yamada et al. | 60/299 |
| 3,981,145 | 9/1976 | Noguchi et al. | 60/288 |
| 4,050,903 | 9/1977 | Bailey et al. | 60/299 |
| 4,085,586 | 4/1978 | Shibata | 60/277 |
| 4,165,611 | 8/1979 | Ishikawa | 60/290 |
| 4,180,975 | 1/1980 | Takagi et al. | 60/290 |
| 4,188,783 | 2/1980 | Sayo et al. | 60/277 |
| 4,218,422 | 8/1980 | Schock et al. | 422/171 |
| 4,283,368 | 8/1981 | Harada et al. | 60/299 |
| 4,354,349 | 10/1982 | Otani et al. | 60/299 |
| 4,444,725 | 4/1984 | Feaster | 422/180 |
| 4,457,895 | 7/1984 | Prigent | 422/179 |
| 4,579,194 | 4/1986 | Shiki et al. | 422/172 |
| 4,830,833 | 5/1989 | Shaff | 422/172 |
| 4,890,690 | 1/1990 | Fischer et al. | 181/240 |
| 5,043,147 | 8/1991 | Knight | 422/180 |

FOREIGN PATENT DOCUMENTS

| | | |
|---|---|---|
| 8807068 | 5/1988 | Fed. Rep. of Germany . |
| 2214323 | 9/1974 | France . |
| 1456025 | 11/1976 | United Kingdom . |

*Primary Examiner*—Noah P. Kamen
*Attorney, Agent, or Firm*—Andrus, Sceales, Starke & Sawall

[57] ABSTRACT

A catalytic converter is mounted at the exhaust gas outlet of a muffler for a two or four-cycle internal combustion engine of the type having one or two cylinders such as those used for lawn and garden equipment. The catalytic converter is located exteriorly of the muffler body in the path of the exhaust gases for oxidizing and/or reducing exhaust gas components subsequent to their discharge from the muffler. Secondary air supply is provided upstream of the catalyst within the converter by mounting the catalytic converter to provide a gap between the converter and the muffler body. Alternately, secondary air is provided by at least one opening formed in the converter upstream of the catalyst which communicates between the interior of the converter and atmosphere. A reed valve may be associated with each opening which is operable in response to exhaust gas pressure pulsations between a normally closed position and an open position to permit atmospheric air to flow into the interior of the converter upstream of the catalyst.

53 Claims, 3 Drawing Sheets

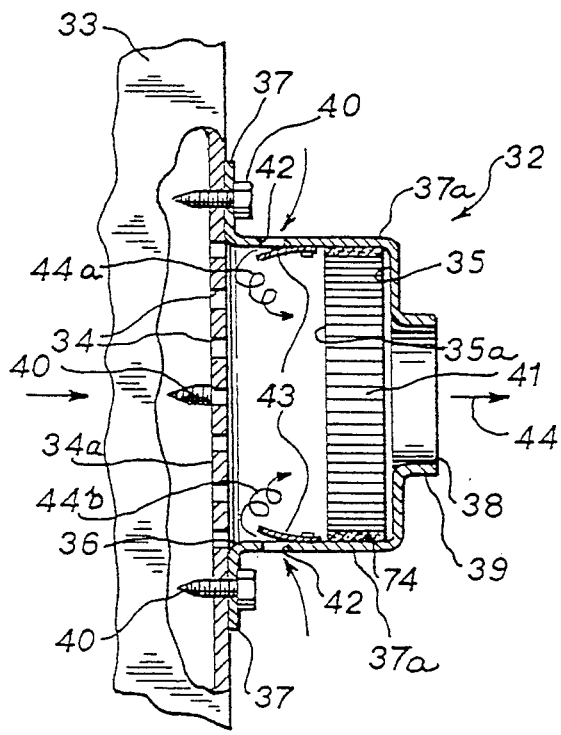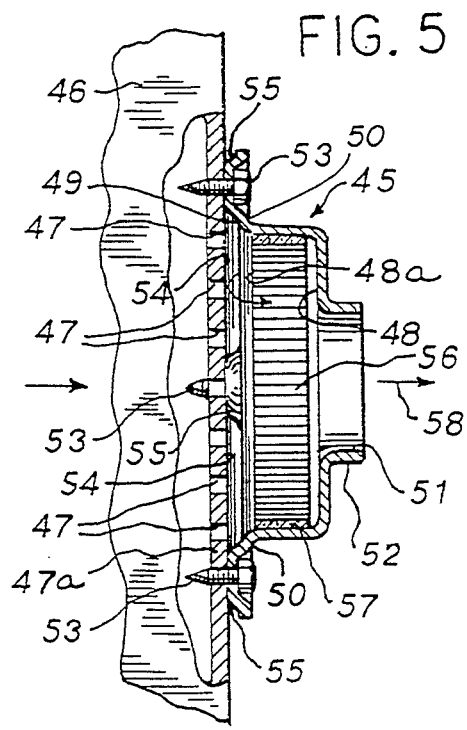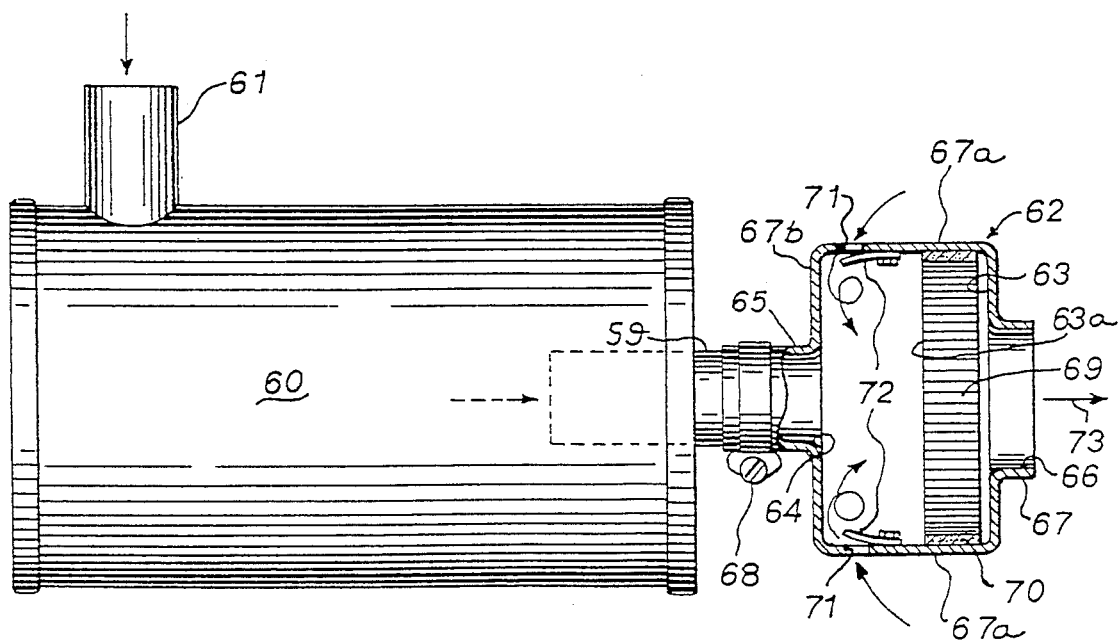

1

EXTERNAL CATALYTIC CONVERTER FOR SMALL INTERNAL COMBUSTION ENGINES

BACKGROUND OF THE INVENTION

The present invention relates to an exhaust system for a small internal combustion engine, and more particularly to a catalytic converter for two or four-cycle engines of the type having one or two cylinders having an arrangement for introducing secondary air into the catalytic converter.

In order to reduce harmful hydrocarbons, carbon monoxide and nitrous oxide components in exhaust gas, it is known to utilize a catalytic converter containing a catalyzer disposed in the exhaust system of the engine upstream of a muffler. It is also known to feed secondary air into the exhaust system upstream of the catalytic converter for promoting oxidation of unburned hydrocarbons and carbon monoxide components in the exhaust gas to thereby reduce the expelling of such harmful components into the atmosphere.

The secondary air supply system generally comprises one of two different designs. The first type is an engine driven air pump such as a belt driven vein pump mounted to a conventional internal combustion engine to inject compressed air into the exhaust manifold of the engine by way of an air injection manifold. Alternately, it is also been proposed to utilize exhaust gas pulsation in the exhaust manifold of automobile engines for injecting secondary air into the exhaust system upstream of a catalytic converter. In particular, it is known to utilize atmospheric air as the secondary air to be introduced upstream of a catalytic converter in the exhaust system by using a reed-type check valve which is operated by the action of exhaust pressure pulsations generated in the exhaust manifold. The engine driven air pump has the advantage that it is capable of supplying any variable quantity of secondary air into the exhaust system while the system employing exhaust gas pulsation to produce the pumping action has the advantage that the supply of secondary air is obtained by a relatively simple and inexpensive structure.

SUMMARY OF THE INVENTION

A catalytic converter is mounted at the exhaust gas outlet of a muffler for a two or four-cycle internal combustion engine of the type having one or two cylinders such as those used for lawn and garden equipment. The catalytic converter is disposed exteriorly of the muffler body in the path of the exhaust gases for oxidizing and reducing exhaust gas components subsequent to their discharge into the atmosphere. If necessary, a secondary air supply is provided upstream of the catalyst and externally of the muffler by mounting the catalytic converter so as to provide an aperture in the form of a gap between the converter and the muffler body. Alternately, secondary air is provided by at least one aperture in the form of a hole formed in the converter housing upstream of the catalyst and externally of the muffler which communicates between the interior of the converter and atmosphere. A reed valve may also be associated with each opening if desired or required. The reed valve is operable in response to exhaust gas pressure pulsations between a normally closed position and an open position to permit atmospheric air to flow into the interior of the converter upstream of the catalyst.

The present invention thus provides a simple and economical catalytic converter for small internal combustion engines. The secondary air supply system is incorporated directly with the converter and therefore does not add any appreciable volume to the muffler or add any appreciable weight to the engine. Also, the air supply system is self actuating, that is, it is operable by the exhaust gas pulsations in the muffler to produce its pumping action and therefore does not reduce engine power as would belt driven type air pumps. Therefore, this system does not require any external mechanical or electrical energy source.

BRIEF DESCRIPTION OF THE DRAWINGS

The drawings illustrate the best mode presently contemplated of carrying out the invention.

In the drawings:

FIG. 4 is a cross-sectional view similar to FIGS. 2 and 3 illustrating a third embodiment of the muffler and catalytic converter assembly;

FIG. 5 is a cross-sectional view similar to FIGS. 2-4 illustrating a fourth embodiment of the muffler and catalytic converter assembly;

FIG. 6 is a side view in elevation with parts broken away and in section of a catalytic converter similar to that shown in FIG. 4 clamped to an exhaust gas outlet pipe of a cylindrically shaped muffler;

DESCRIPTION OF THE PREFERRED EMBODIMENTS

Figure 1:
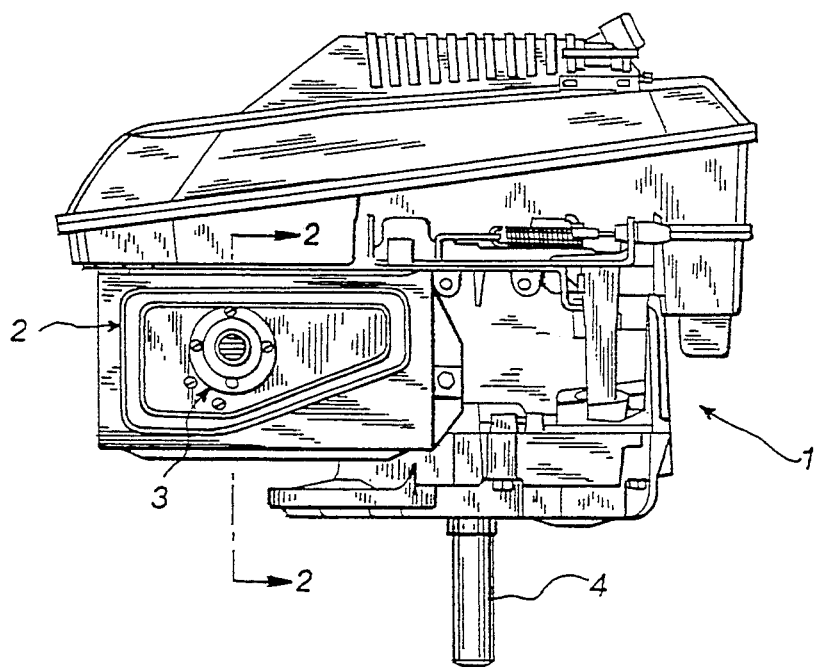
FIG. 1 is a side view in elevation of an internal combustion engine incorporating a muffler assembly including a catalytic converter constructed in accordance with the principles of the present invention.

Referring now to the drawings, FIG. 1 illustrates an internal combustion engine generally designated by the numeral 1 incorporating a muffler assembly in accordance with the present invention. The muffler assembly includes a muffler 2 and a catalytic converter 3 mounted on the exterior surface thereof. As illustrated, engine 1 is of the two or four-cycle type having relatively low horsepower i.e. less than 20 horsepower, and having one or two cylinders. Engine 1 is of the type that might typically be utilized in connection with lawn and garden equipment such as lawnmowers, rotor tillers, generators, pumps and the like. Engine 1 includes a crankshaft 4 conventionally powered by a piston and cylinder arrangement (not shown) and whose speed is controlled by a throttle mechanism. The throttle mechanism includes a control cable which typically leads to a bale and handle assembly (not shown) utilized by an operator to control the speed of engine 1.

Figure 2:
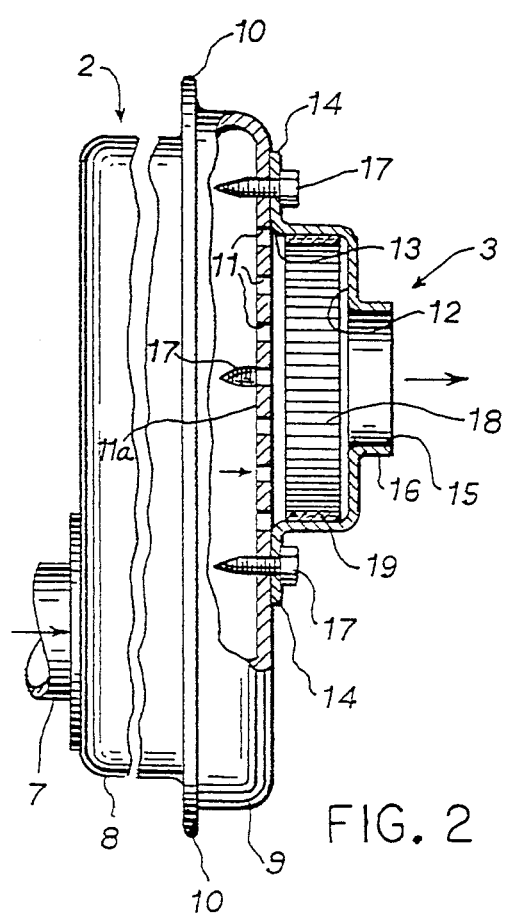
FIG. 2 is a fragmentary cross-sectional view taken along the plane of the line 2—2 in FIG. 1.

Referring now to FIG. 2, the muffler assembly is illustrated in more detail. The muffler assembly includes a muffler 2 having an exhaust gas inlet 7 connected to the exhaust outlet from the cylinder head (not shown) of engine 1. Muffler 2 is comprised of a two-piece housing including a cup-shaped body 8 and cover 9 which are secured together by means of a circumferential clinch or crimp 10. Body 8 and cover 9 define an interior chamber which may include numerous baffle arrangements and/or chambers for sound attenuation purposes, as is conventional. Muffler 2 also includes an exhaust gas outlet formed in the front flat wall 11a of cover 9 by means of a plurality of holes 11 providing a perforated wall portion therein. The perforated wall portion 11a defined by holes 11 produces backpressure on the exhaust gases, and causes them to be uniformly distributed over the face of the catalyst coated element 18. Although illustrated as a perforated portion of cover 9, the exhaust gas outlet may also take other forms such as a tube either flush or projecting externally from the muffler 2.

As best shown in FIG. 2, catalytic converter 3 is disposed exteriorly of muffler 2 for oxidizing and reducing unburned exhaust gas components such as hydrocarbons, carbon monoxide and nitrous oxide subsequent to those components being discharged from outlet holes 11. Converter 3 is thus located downstream of outlet 11, and in the path of the exhaust gases as they exit muffler 2. Converter 3 is in the form of a hollow housing defining an interior annular chamber 12. Chamber 12 has an upstream opening 13 communicating with outlet holes 11 which opening 13 is defined by an outturned circumferentially extending flange 14, and a downstream opening 15. As illustrated in FIG. 2, opening 15 is defined by an axially extending collar 16, but opening 15 may also be defined by a side discharge, louvered or other arrangement. Converter 3 is mounted on muffler 2 by means of fasteners such as four sheet metal screws 17 passing through flange 14 into the front wall of cover 9. As is well known, converter 3 may be mounted on muffler 2 by other convenient means such as welding, riveting, adhesives or the like. As shown in FIG. 2, flange 14 bears tightly against the front wall of cover 9 so that since upstream opening 13 and downstream opening 15 are the only openings in converter 3 all exhaust gas passes through converter 3 without the addition of secondary air. Depending upon engine design, size and horsepower, it may not be necessary to supply additional air into converter 3 to oxidize exhaust gas components. Therefore, the air tight arrangement illustrated in FIG. 2 may be sufficient as long as an appropriate catalyzer element is employed within converter 3.

In order to accomplish this, catalytic converter 3 includes a catalyzer element 18 which in the illustrated embodiment is in the form of a honeycombed ceramic or metal structure. As is well known, catalyzer element 18 may be of other shapes, sizes and materials. The structure is appropriately sized for the engine displacement and emission reduction desired. The substrate of catalyzer element 18 is coated with an oxidizing and reducing catalyst of any known composition. A combination of platinum, palladium and rhodium is commonly utilized. However, any combination of known oxidizing and reducing catalyst material may be employed. After passing through catalyzer element 18, the exhaust gas exits chamber 12, and finally exits converter 3 through outlet 15. The coated honeycombed structure of catalyzer element 18 is held within chamber 12 by means of an annular heat expandable gasket 19. Gasket 19 initially holds catalyzer element 18 in a press fit manner within chamber 12. However, during use of engine 1 heat from the exhaust gases causes gasket 19 to swell and thereby expand radially inwardly to firmly hold structure 18.

Upon cooling, gasket 19 only contracts radially to about one half its original thickness thus providing a permanent mounting for catalyzer element 18. Gasket 19 may be composed of a vermiculite based material such as that available under the trademark "Interam" available from the 3M Company or the like.

Referring now to FIGS. 3–8 there is illustrated five additional embodiments of the present invention which provide for the introduction of secondary air to the catalytic converter at a location upstream of the catalyzer element 18. Therefore, the structure of the catalytic converter may be identical to or very similar to that illustrated and described with respect to FIG. 2. However, the primary difference in the embodiments of FIGS. 3–8 is in the means for supplying secondary air to the converter 3 upstream of the catalyzer. As illustrated, the supply of secondary air is preferably provided by an aspirator arrangement which creates a venturi effect for drawing air into an exhaust gas stream passing through the catalytic converter.

Figure 3:
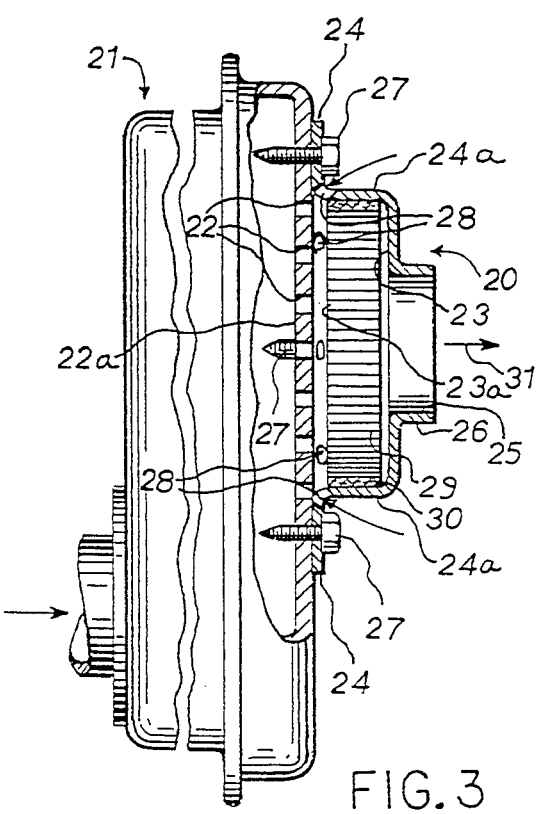
FIG. 3 is a cross-sectional view similar to FIG. 2 showing a second embodiment of the muffler and catalytic converter assembly.

Referring now specifically to FIG. 3, there is illustrated a catalytic converter 20 disposed exteriorly of a muffler 21 for oxidizing and/or reducing exhaust gas components being discharged from muffler 21 out of holes 22 in the perforated outlet wall 22a of muffler 21. Converter 20 is thus located downstream of outlet holes 22 and in the path of the exhaust gases as they exit muffler 21. As in FIG. 2, perforated wall portion 22a produces exhaust gas backpressure, and results in the exhaust gases being uniformly distributed to catalyzer element 29. Converter 20 is in the form of a hollow housing defining an interior annular chamber 23. Chamber 23 has an upstream opening communicating with outlet holes 22 which opening is defined by an outturned circumferential flange 24, and a downstream opening 25 communicating with atmosphere which opening is defined by an axially extending collar 26. Converter 20 is mounted on muffler 21 by means of four sheet metal screws 27 passing through flange 24 into the front wall 22a of muffler 21. As shown in FIG. 3, converter 20 includes a plurality of apertures 28 communicating between the interior of chamber 23 and atmosphere at a location upstream from catalyzer element 29. Catalyzer element 29 is identical in structure to that illustrated in FIG. 1 and is mounted via an expandable gasket 30 in the same manner as that described with respect to FIG. 2. Catalyzer element 29 is spaced downstream from the external surface of wall 22a so as to form a mixing chamber 23a for mixing air entering via apertures 28 and exhaust gases entering via holes 22. Apertures 28 may be formed in the housing of converter 20 at any location upstream from catalyzer element 29, but as illustrated in FIG. 3 are preferably located at the point where flange 24 is formed and turns 90° with respect to the annular housing containing catalyzer element 29, i.e. at the intersection of the L-shaped structure formed by flange 24 and side wall 24a. This location for apertures 28 results in the atmospheric secondary air being aspirated into chamber 23a, and due to the different direction of travel of the stream of air versus the stream of exhaust gases, creates turbulence to aid in mixing the air and exhaust gases. Flange 24 and side wall 24a of converter 20 converge toward one another at the location of apertures 28 which, together with the flow of exhaust gases within chamber 23a, produces a venturi effect and causes secondary air to be drawn through apertures 28, aspirated into chamber 23a in the exhaust gas stream, and thereby thoroughly mixed with the exhaust gas prior to entering catalyzer element 29.

In operation, atmospheric air is introduced upstream of catalytic converter 20 through apertures 28 to catalyzer element 29 by utilizing exhaust gas pulsation generated in the exhaust manifold. Accordingly, whenever there is negative pressure within the exhaust system, atmospheric air will be drawn and aspirated into the interior of converter 20 upstream of catalyzer element 29 in the space between front wall 22a and element 29, i.e. mixing chamber 23a, through apertures 28. During periods of positive pressure in the system, this secondary air mixed together with the exhaust gases will be forced through converter 20 and catalyzer element 29 prior to being exhausted through outlet 25 to atmosphere. Emissions, as illustrated by arrow 31, are thus further oxidized and/or reduced before entering the atmosphere.

Referring now to FIG. 4, there is illustrated a third embodiment comprising a catalytic converter 32 disposed exteriorly of a muffler 33 for oxidizing and/or reducing exhaust gas components being discharged from muffler outlet holes 34 in a perforated outlet wall 34a of muffler 33. Converter 32 is located downstream of outlet holes 34, and in the path of the exhaust gases as they exit muffler 33. As in FIGS. 2 and 3, perforated wall 34a produces exhaust gas backpressure, and results in the exhaust gases being uniformly distributed to catalyzer element 41. Converter 32 is in the form of a hollow housing defining an interior annular chamber 35. Chamber 35 has an upstream opening 36 communicating with outlet holes 34 which opening is defined by an outturned circumferentially extending flange 37, and a downstream opening 38 communicating with atmosphere which opening is defined by an axially extending collar 39. Converter 32 is mounted on muffler 33 by means of four sheet metal screws 40 passing through flange 37 into the front wall 34a of muffler 33. A honeycombed catalyzer element 41 is identical in structure and has a similar mounting arrangement in chamber 35 utilizing an expandible gasket 74 as that illustrated and described with respect to FIGS. 2 and 3. As illustrated in FIG. 4, converter 32 extends axially outwardly further from muffler 33 than that of converters 3 or 20 in FIGS. 2 or 3. Thus, catalyzer element 41 is spaced axially a greater distance from outlet holes 34 of muffler 33 to provide a larger more cylindrically shaped annular mixing chamber 35a. The embodiment illustrated in FIG. 4 also includes a plurality of apertures 42 formed in side wall 37a of converter 32 upstream of catalyzer element 41 and downstream of muffler outlet holes 34. The greater cylindrical space provided between muffler outlet holes 34 and catalyzer element 41 forming mixing chamber 35a also enables the use of a plurality of reed valves 43 to be utilized in cooperation with apertures 42. Reed valves 43 and chamber 35a provide improved mixing of secondary air and exhaust gases prior to their entry into catalyzer 41. Accordingly, a reed valve 43 is associated with each aperture 42 and is mounted along the interior surface of chamber 35 so that valves 43 normally cover apertures 42 and are flexed to an open position to enable atmospheric air to enter the interior of converter 32. Valves 43 are mounted so as to open in a direction opposite to the flow of exhaust gases, i.e. in an upstream direction, so as to create or induce turbulence within chamber 35a. As shown by arrows 44a and 44b, reed valves 43, when open, result in the atmospheric secondary air being aspirated into chamber 35a which creates turbulence to aid in mixing the air and exhaust gases. This is a result of the venturi effect created by the flow of exhaust gases within chamber 35a and the relatively small opening formed between the reed valve elements and the edge of apertures 42.

Thus, in operation, reed valves 43 are opened during the negative pressure periods within the exhaust gas system and converter 32, and are closed during the positive pressure pulsations within the system. Reed valves 43 thus permit secondary air to be introduced upstream of catalyzer 41 during the negative pressure pulsations, and covers apertures 42 during the positive pressure pulsations in the system. Thus, all mixed exhaust gases and secondary air must pass through catalyzer element 41 prior to exiting outlet 38 to atmosphere. Emissions, as illustrated by arrow 44, are thus further oxidized and/or reduced before entering the atmosphere.

Referring now to FIG. 5, there is illustrated a fourth embodiment. In this fourth embodiment, catalytic converter 45 is disposed exteriorly of a muffler 46 for oxidizing and/or reducing exhaust gas components being discharged from muffler outlet holes 47 in the perforated outlet wall 47a of muffler 46. Converter 45 is thus located downstream of outlet holes 47, and in the path of the exhaust gases as they exit muffler 46. As in FIGS. 2–4, perforated wall 47a produces exhaust gas backpressure, and results in the exhaust gases being uniformly distributed to catalyzer element 56. Converter 45 is in the form of a hollow housing defining an interior annular chamber 48. Chamber 48 has an upstream opening 49 communicating with muffler outlet holes 47 which opening is defined by an outturned circumferentially extending flange 50, and a downstream opening 51 communicating with atmosphere which opening is defined by an axially extending collar 52. Converter 45 is mounted on muffler 46 by means of four sheet metal screws 53 passing through flange 50 into the front wall 47a of muffler 46. As shown in FIG. 5, flange 50 is spaced from the front wall 47a of muffler 46 to form four arcuate shaped gaps or slots 54. The spacing of converter 45 from the front wall 47a of muffler 46 is accomplished by four circumferentially spaced spacers 55 in the form of integral bosses or projections from flange 50, or the like. Screws 53 thus pass through flange 50 and spacers 55 into the front wall 47a of muffler 46. The width of the apertures, which in this embodiment is in the form of arcuate gaps or slots 54 can be adjusted by adjusting the height of spacers 55 to thereby enable more or less atmospheric air to enter converter 45. Thus, the arcuate gaps 54 provide a means for supplying secondary air to the interior of converter 45, and as illustrated in FIG. 5 are located downstream from outlet holes 47 but upstream from catalyzer element 56. Catalyzer element 56 is identical to that illustrated and described with respect to the embodiments of FIGS. 2–4 and comprises a honeycombed structure secured within converter 45 by means of a thermally expandable annular gasket 57, as hereinbefore described. Catalyzer element 56 is spaced downstream from the external surface of wall 47a so as to form a mixing chamber 48a for mixing air entering via arcuate gaps 54 and exhaust gases entering via holes 47. As previously mentioned, the width of the gaps or slots 54, i.e. the axial distance between the external surface of wall 47a and flange 50, may be adjusted so that secondary air is aspirated into chamber 48a which creates turbulence to aid in mixing the air and exhaust gases.

The width of gaps 54, together with the flow of exhaust gases within chamber 48a, produces a venturi effect and causes air to be drawn through gaps 54, aspirated into chamber 48a into the exhaust gas stream, and thereby thoroughly mixed with the exhaust gases prior to entering catalyzer element 56.

In operation, the exhaust gas pulsations which develop in the exhaust system function to draw atmospheric air into the interior of converter 45 during the negative pressure pulsations of the engine while the positive pressure pulsations cause the mixed exhaust gases and secondary air to be forced through converter 45 and catalyzer element 56. Emissions, as illustrated by arrow 58, may thus be oxidized and/or reduced prior to exiting converter 45 into the atmosphere.

Referring now to FIG. 6, there is illustrated a further embodiment of the invention similar to the third embodiment illustrated in FIG. 4 except adapted to be mounted on an outlet pipe 59 of a cylindrically shaped muffler 60 having an inlet 61 connected to the exhaust manifold (not shown) of an internal combustion engine. Accordingly, FIG. 6 illustrates a catalytic converter 62 disposed exteriorly of muffler 60 for oxidizing and/or reducing unburned exhaust gas components subsequent to those components being discharged from outlet pipe 59 of muffler 60. Converter 62 is thus located downstream of outlet 59, and in the path of the exhaust gases as they exit muffler 60. Converter 62 is in the form of a hollow housing defining an interior annular chamber 63. Chamber 63 has an upstream opening 64 communicating with outlet pipe 59 which opening is defined by an inlet tube 65 integrally formed on the upstream end of converter 62, and a downstream opening 66 communicating with atmosphere which opening is defined by an axially extending collar 67. Converter 62 is mounted on outlet pipe 59 of muffler 60 by means of a clamp member 68 which encircles the overlapping portions of inlet tube 65 and outlet pipe 59. In order to accomplish the oxidizing and reducing of the exhaust gas components, converter 62 includes a catalyzer element 69 identical in honeycombed structure to that previously described herein, and mounted within converter 62 via a thermally expandable annular gasket 70 in the same manner as herein described with respect to FIGS. 2-5. Catalyzer element 69 is located at the downstream end of converter 62 closely adjacent to outlet 66 and thus is spaced from inlet 64 to provide a relatively large cylindrical inner mixing chamber 63a. In order to provide secondary air to the interior of chamber 63a, converter 62 includes a plurality of apertures 71 formed in side wall 67a of converter 62 downstream from inlet 64 but upstream from catalyzer element 69 which communicate between the interior of converter 62 and atmosphere. Although illustrated in FIG. 6 as being in side wall 67a, apertures 71 may also be formed in back wall 67b. As a means for controlling the passage of secondary air between atmosphere and the interior of converter 62, converter 62 includes a reed valve 72 located at each aperture 71. The reed valves 72 are mounted on the interior surface of converter 62 and are normally unflexed in a closed position to prevent air from entering the interior of converter 62. Reed valves 72 may be flexed radially inwardly to an open position whereby apertures 71 are uncovered in order to permit atmospheric air to enter chamber 63a in the interior of converter 62 upstream of catalyzer 69 during the negative pressure pulsation time periods of the exhaust gas system. As is apparent, during the positive pressure pulsation time periods within the exhaust gas system the reed valves 72 move to their closed positions wherein apertures 71 are covered to prevent atmospheric air from entering converter 62. Reed valves 72 function in the identical manner as previously described with respect to FIG. 4 to aspirate secondary air into chamber 63a to thereby create turbulence which, together with the venturi effect created by the flow of exhaust gases within chamber 63a, aids in mixing the air and exhaust gases. Thus, during the positive pressure pulsation time periods of the engine all of the mixed exhaust gas and secondary air within the system will be forced past catalyzer element 69 to oxidize and reduce the exhaust gas components therein prior to their exiting converter 62 through outlet 66 to atmosphere, as shown by arrow 73.

Figures 7, 8:
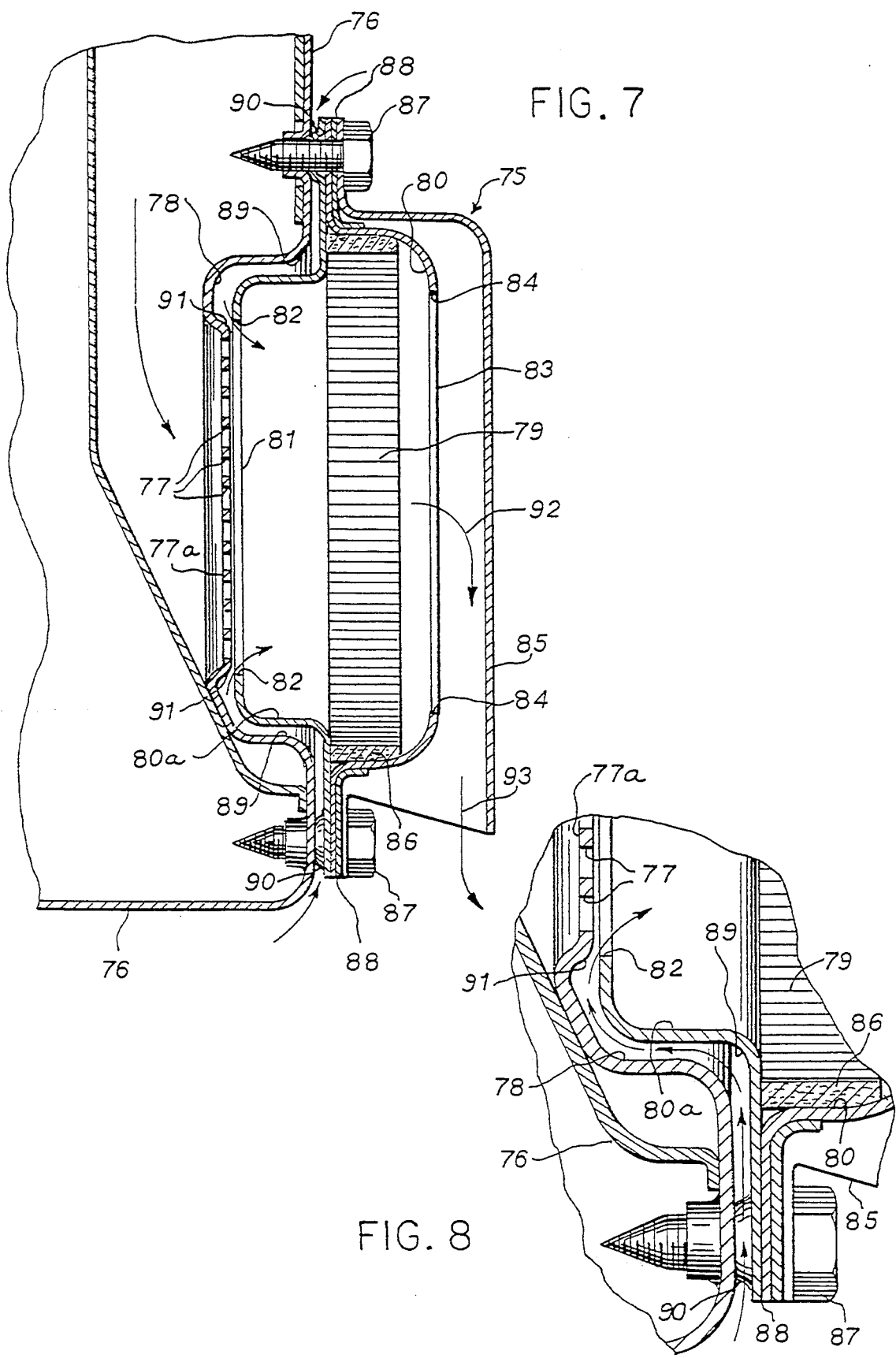
FIG. 7 is a fragmentary cross-sectional view similar to FIGS. 4-5 illustrating a fifth embodiment of the muffler and catalytic converter assembly.
FIG. 8 is an enlarged fragmentary cross-sectional view of the structure for supplying secondary air to the converter of FIG. 7.

Referring now to FIGS. 7-8, there is illustrated a fifth embodiment of the muffler and catalytic converter assembly. In this fifth embodiment, catalytic converter 75 is once again disposed exteriorly of a muffler 76 for oxidizing and/or reducing exhaust gas components being discharged from muffler outlet holes 77 in a perforated outlet wall 77a of muffler 76. However, the perforated front wall 77a is formed in a recess 78, and the catalytic converter 75 is mounted to partially extend into recess 78 thus creating a "low profile" assembly. Converter 75 is thus once again located downstream of outlet holes 77, and in the path of the exhaust gases as they exit muffler 76. As in FIGS. 2-5, perforated wall 77a produces exhaust gas backpressure, and results in the exhaust gases being uniformly distributed to catalyzer element 79. Converter 75 is in the form of a hollow housing defining a pair of interior annular chambers 80 and 80a. Chamber 80a has an upstream opening 81 communicating with outlet holes 77 which opening is defined by edges 82, and a downstream opening 83 communicating with atmosphere which opening is defined by edges 84. A deflector 85 is incorporated with converter 75 to alter the flow of exhaust gases exiting opening 83 to provide a side out arrangement for converter 75. Catalyzer element 79 is identical to that illustrated and described with respect to the embodiments of FIGS. 2-6 and comprises a honeycombed structure secured within chamber 80 of converter 75 by means of a thermally expandable annular gasket 86, as hereinbefore described. Catalyzer element 79 is spaced downstream from the external surface of wall 77a so as to form mixing chamber 80a for mixing secondary air and exhaust gases.

Converter 75 is mounted on muffler 76 by means of four sheet metal screws 87 passing through a peripheral circumferentially extending flange 88 into the front wall 77a of muffler 76. As shown best in FIG. 8, flange 88 is spaced from the front wall 77a of muffler 76 to form four apertures in the form of arcuate shaped gaps or slots 89. The spacing of converter 75 from the front wall 77a of muffler 76 is accomplished by four spacers 90 in the form of integral bosses or projections from flange 88, or the like. Screws 87 thus pass through flange 88 and spacers 90 into the front wall 77a of muffler 76. The width of arcuate gaps or slots 89 can be adjusted by altering the height of spacers 90 to thereby enable more or less atmospheric air to enter chamber 80a of converter 75. Thus, the arcuate gaps 89 provide a means for supplying secondary air to the interior of converter 75, and as illustrated in FIGS. 7 and 8, are located downstream from outlet holes 77 but upstream from catalyzer element 79. As previously mentioned, the width of gaps 89, i.e. the axial distance between the external surface of wall 77a and flange 88, may be adjusted so that more or less secondary air is aspirated into mixing chamber 80a. Aspiration of the secondary air into mixing chamber 80a is accomplished by an area of reduced cross section formed between the external surface of front wall 77a of muffler 76 and edges 82 of upstream opening 81 in converter 75, as shown best at constriction 91 in FIGS. 7 and 8. These constrictions 91 together with the flow of exhaust gases within mixing chamber 80a, produce a venturi effect and cause secondary air to be drawn through gaps 89, aspirated into mixing chamber 80a into the exhaust gas stream to induce turbulence within chamber 80a, and thereby thoroughly mixed within chamber 80a with the exhaust gas prior to entering catalyzer element 79. As previously mentioned, the width of arcuate gaps or slots 89, may be adjusted to vary the mount of secondary air introduced into mixing chamber 80a. It should be noted that due to converter 75 being located partially within recess 78 of muffler 76, there is a serpentine or tortuous path created by gaps or slots 89. As shown best in FIG. 8, secondary air must make approximately three 90° turns before entering into mixing chamber 80a. This tortuous path creates an assembly wherein the amount of secondary air being drawn into mixing chamber 80a can be finely tuned. Also, the relationship between the constrictions 91, the gap area and the length of the tortuous path formed by gaps 89 functions to substantially prohibit any reverse loss of exhaust gases during the positive pressure pulsations of the engine. In other words, the small cross-sectional area of constrictions 91 together with the tortuous path formed by gaps 89 prohibit any loss of exhaust gases through gaps 89. Thus, all mixed exhaust gases and secondary air pass through catalyzer element 79 prior to exiting outlet 83 to atmosphere. Emissions, as illustrated by arrows 92 and 93, are thus further oxidized and/or reduced before entering the atmosphere.

A muffler assembly for an exhaust system of an internal combustion engine has been illustrated and described. It should be particularly noted that the means for supplying secondary air to the interior of a catalytic converter mounted exteriorly of a muffler may take various forms as is readily apparent to those skilled in the art. For example, the chambers 35a and 63a illustrated with respect to the embodiments of FIGS. 4 and 6 could also be utilized with the embodiments of FIGS. 2, 3 and 5 to improve mixing of secondary air with exhaust gases.

Various modes of carrying out the invention are contemplated as being within the scope of the following claims particularly pointing out and distinctly claiming the subject matter regarded as the invention.

We claim:

1. A muffler assembly for an exhaust system of an internal combustion engine, comprising:
   a hollow muffler body having an exhaust gas inlet and an exhaust gas outlet;
   a catalytic converter including catalyzer means disposed exteriorly of said muffler body for oxidizing and reducing exhaust gas components subsequent to said components being discharged from said exhaust gas outlet; and
   mounting means for mounting said catalytic converter on said muffler body at said exhaust gas outlet.

2. The muffler assembly of claim I wherein said catalytic converter comprises a hollow housing defining an interior chamber having an upstream opening communicating with said outlet and a downstream opening communicating with atmosphere, and said catalyzer means is disposed within said chamber between said upstream and downstream openings.

3. The muffler assembly of claim 2 wherein said upstream and downstream openings are the only openings communicating with the interior of said housing.

4. The muffler assembly of claim 2 wherein said housing further includes at least one aperture communicating between said chamber and atmosphere, said aperture disposed upstream of said catalyzer means.

5. The muffler assembly of claim 4 wherein said aperture comprises a hole through said housing.

6. The muffler assembly of claim 4 wherein said aperture comprises a gap foraged between said muffler body and said catalytic converter.

7. The muffler assembly of claim 6 wherein said gap is formed by a spacer disposed between said muffler body and said catalytic converter.

8. A muffler assembly for an exhaust system of an internal combustion engine, comprising:
   a hollow muffler body having an exhaust gas inlet and an exhaust gas outlet;
   a catalytic converter disposed exteriorly of said muffler body for oxidizing and reducing exhaust gas components subsequent to said components being discharged from said exhaust gas outlet, said catalytic converter comprises a hollow housing defining an interior chamber having an upstream opening communicating with said outlet and a downstream opening communicating with atmosphere, and a catalyzer element disposed within said chamber between said upstream and downstream openings;
   a secondary air supply means operable in response to exhaust gas pressure within said catalytic converter housing which permits atmospheric air to flow into the interior of said housing upstream of said catalyzer element; and
   mounting means for mounting said catalytic converter on said muffler body at said exhaust gas outlet.

9. The muffler assembly of claim 8, wherein said secondary air supply means includes aspirator means for drawing secondary air into the interior of said housing upstream of said catalyzer element.

10. The muffler assembly of claim 9 wherein said aspirator means includes at least one aperture communicating between said chamber and atmosphere, said aperture disposed upstream of said catalyzer element.

11. The muffler assembly of claim 10 wherein said aperture comprises a hole through said housing.

12. The muffler assembly of claim 11 wherein said catalytic converter housing includes an annular side wall and a circumferential mounting flange which together form an L-shaped member, and said hole is located at the intersection of said side wall and flange.

13. The muffler assembly of claim 11 wherein said catalytic converter housing includes an annular side wall and a circumferential mounting flange which together form an L-shaped member, and said hole is located in said side wall.

14. The muffler assembly of claim 10 wherein said aperture comprises a gap formed between said muffler body and said catalytic converter.

15. The muffler assembly of claim 14 wherein said gap is formed by a spacer disposed between said muffler body and said catalytic converter.

16. The muffler assembly of claim 14 wherein said catalytic converter housing includes an annular side wall and a circumferential mounting flange which together form an L-shaped member, and said gap is located between said flange and said muffler body.

17. The muffler assembly of claim 16 wherein said gap includes a constriction located adjacent said upstream opening.

18. The muffler assembly of claim 14 wherein said gap is serpentine in shape.

19. The muffler assembly of claim 14 wherein said gap has at least one turn of about 90° therein.

20. The muffler assembly of claim 19 wherein said gap includes a constriction located therein.

21. The muffler assembly of claim 9 wherein said aspirator means includes an aperture formed in said housing located between said upstream and downstream openings and upstream of said catalyzer element, and valve means operable to open and close said aperture.

22. The muffler assembly of claim 21 wherein said valve means comprises a reed valve.

23. The muffler assembly of claim 22 wherein said reed valve is mounted on an internal surface of said housing.

24. The muffler assembly of claim 9 wherein said aspirator means further includes a turbulence inducing element for promoting mixing of said secondary air and exhaust gases within the interior of said housing upstream of said catalyzer element.

25. The muffler assembly of claim 24 wherein said aspirator means comprises at least one aperture communicating between said chamber and atmosphere, said aperture disposed upstream of said catalyzer element, and said turbulence inducing element comprises valve means operable to open and close said aperture.

26. The muffler assembly of claim 25 wherein said valve means comprises a reed valve.

27. The muffler assembly of claim 26 wherein said reed valve is mounted on an internal surface of said housing and opens in an upstream direction opposite to the direction of flow of the exhaust gases in said housing.

28. A muffler assembly for an exhaust system of an internal combustion engine, comprising:
a hollow muffler body having an exhaust gas inlet and an exhaust gas outlet;
a catalytic converter disposed exteriorly of said muffler body for oxidizing and reducing exhaust gas components subsequent to said components being discharged from said exhaust gas outlet, said catalytic converter comprises a hollow housing having an upstream opening communicating with said exhaust gas outlet and a downstream opening communicating with atmosphere, said hollow housing defining a mixing chamber adjacent said upstream opening and a catalyzer-receiving chamber downstream of said mixing chamber, and a catalyzer element disposed within said catalyzer-receiving chamber;
an aspirator for drawing secondary air into said mixing chamber to thereby mix with a stream of exhaust gas passing through said catalytic converter housing; and
mounting means for mounting said catalytic converter on said muffler body at said exhaust gas outlet.

29. The muffler assembly of claim 28 wherein said catalytic converter housing is cylindrically shaped defining an annular side wall encompassing said mixing chamber, and said aspirator includes at least one aperture formed in said side wall communicating between said mixing chamber and atmosphere.

30. The muffler assembly of claim 28 wherein said catalytic converter housing is cylindrically shaped defining an annular side wall encompassing said mixing chamber, said mounting means includes a flange which together with said annular side wall forms an L-shaped structure, and said aspirator includes at least one aperture formed at the intersection of said side wall and flange communicating between said mixing chamber and atmosphere.

31. The muffler assembly of claim 28 wherein said catalytic converter housing is cylindrically shaped defining an annular side wall encompassing said mixing chamber, said mounting means includes a flange which together with said annular side wall forms an L-shaped structure, said flange including a spacer disposed between said flange and said muffler body, and said aspirator includes a gap formed between said muffler body and said annular side wall communicating between said mixing chamber and atmosphere.

32. The catalytic converter of any one of claims 29, 30, or 31 wherein said aspirator further includes turbulence inducing means for creating turbulence in the air entering said mixing chamber.

33. The catalytic converter of claim 32 wherein said turbulence inducing means comprises a constriction formed in said aperture.

34. The catalytic converter of claim 32 wherein said turbulence inducing means comprises a valve operable to open and close said aperture.

35. The catalytic converter of claim 34 wherein said valve comprises a reed valve.

36. The catalytic converter of claim 35 wherein said reed valve is mounted on an internal surface of said housing within said mixing chamber, and opens in an upstream direction opposite to the direction of flow of exhaust gases through said housing.

37. The muffler assembly of claim 31 wherein said muffler body includes a recessed portion having a perforated wall defining said exhaust gas outlet, and the annular side wall and upstream opening of said catalytic converter housing is disposed within said recessed portion.

38. The muffler assembly of claim 37 wherein said gap is serpentine in shape.

39. The muffler assembly of claim 38 wherein said gap includes a constriction located therein adjacent the upstream opening of said catalytic converter housing.

40. The muffler assembly of claim 39 wherein said constriction is formed between a portion of said perforated wall and said catalytic converter housing.

41. A catalytic converter for oxidizing and/or reducing exhaust gas components being discharged from an internal combustion engine, comprising:
a hollow housing having an upstream inlet opening communicating with a source of exhaust gas and a downstream outlet opening communicating with atmosphere, said hollow housing having a side wall defining a mixing chamber adjacent said inlet opening and a catalyzer-receiving chamber downstream of said mixing chamber;

a catalyzer element disposed within said catalyzer-receiving chamber;

an aspirator formed in said housing for drawing air into said mixing chamber to thereby mix with a stream of exhaust gas passing through said housing;

a mounting member extending from said housing for mounting said housing on an engine component; and said catalytic converter housing includes a side wall encompassing said mixing chamber, said mounting member is a flange integral with said side wall and together with said side wall forms an L-shaped structure, and said aspirator includes at least one aperture formed at the intersection of said side wall and flange communicating between said mixing chamber and atmosphere.

42. The catalytic converter of claim 41 wherein said aspirator further includes turbulence inducing means for creating turbulence in the air entering said mixing chamber.

43. The catalytic converter of claim 42 wherein said turbulence inducing means comprises a constriction formed in said aperture.

44. The catalytic converter of claim 42 wherein said turbulence inducing means comprises a valve operable to open and close said aperture.

45. The catalytic converter of claim 44 wherein said valve comprises a reed valve.

46. The catalytic converter of claim 45 wherein said reed valve is mounted on an internal surface of said housing within said mixing chamber, and opens in an upstream direction opposite to the direction of flow of exhaust gases through said housing.

47. A catalytic converter for oxidizing and/or reducing exhaust gas components being discharged from an internal combustion engine, comprising:

a hollow housing having an upstream inlet opening communicating with a source of exhaust gas and a downstream outlet opening communicating with atmosphere, said hollow housing having a side wall defining a mixing chamber adjacent said inlet opening and a catalyzer-receiving chamber downstream of said mixing chamber;

a catalyzer element disposed within said catalyzer-receiving chamber;

an aspirator formed in said housing for drawing air into said mixing chamber to thereby mix with a stream of exhaust gas passing through said housing;

a mounting member extending from said housing for mounting said housing on an engine component; and said catalytic converter housing includes a side wall encompassing said mixing chamber, said mounting member is a flange integral with said side wall and together with said side wall forms an L-shaped structure, said flange including at least one spacer projecting therefrom, and said aspirator includes at least one aperture formed between said spacer, flange and said side wall communicating between said mixing chamber and atmosphere.

48. The catalytic converter of claim 47 wherein said flange extends circumferentially with said side wall and includes a plurality of circumferentially spaced spacers, and there is an arcuate shaped aperture between each of adjacent pairs of spacers.

49. The catalytic converter of claim 47 wherein said aspirator further includes turbulence inducing means for creating turbulence in the air entering said mixing chamber.

50. The catalytic converter of claim 49 wherein said turbulence inducing means comprises a constriction formed in said aperture.

51. The catalytic converter of claim 49 wherein said turbulence inducing means comprises a valve operable to open and close said aperture.

52. The catalytic converter of claim 51 wherein said valve comprises a reed valve.

53. The catalytic converter of claim 52 wherein said reed valve is mounted on an internal surface of said housing within said mixing chamber, and opens in an upstream direction opposite to the direction of flow of exhaust gases through said housing.

* * * * *

UNITED STATES PATENT AND TRADEMARK OFFICE
CERTIFICATE OF CORRECTION

PATENT NO. : 5,339,629
DATED : August 23, 1994
INVENTOR(S) : JAMES R. WINBERG
KEITH O. DABY It is certified that error appears in the above-indentified patent and that said Letters Patent is hereby corrected as shown below:

Claim 6, column 10, line 16:   Delete "foraged" and substitute therefore ---formed---.

Signed and Sealed this

Seventh Day of March, 1995

Attest:

BRUCE LEHMAN

Attesting Officer

Commissioner of Patents and Trademarks